United States Patent
Toivanen et al.

(10) Patent No.: US 9,858,236 B2
(45) Date of Patent: Jan. 2, 2018

(54) SERIAL PROTOCOL OVER DATA INTERFACE

(71) Applicant: Nokia Technologies Oy, Espoo (FI)

(72) Inventors: Timo Juhani Toivanen, Mäntsälä (FI); Jarmo Ilkka Saari, Turku (FI); Timo Tapani Toivola, Turku (FI)

(73) Assignee: Nokia Technologies Oy, Espoo (FI)

( * ) Notice: Subject to any disclaimer, the term of this patent is extended or adjusted under 35 U.S.C. 154(b) by 310 days.

(21) Appl. No.: 14/647,523

(22) PCT Filed: Dec. 4, 2012

(86) PCT No.: PCT/IB2012/056954
§ 371 (c)(1),
(2) Date: May 27, 2015

(87) PCT Pub. No.: WO2014/087193
PCT Pub. Date: Jun. 12, 2014

(65) Prior Publication Data
US 2015/0324320 A1    Nov. 12, 2015

(51) Int. Cl.
*G06F 13/00* (2006.01)
*G06F 13/42* (2006.01)
*G06F 13/40* (2006.01)
*G06F 13/38* (2006.01)

(52) U.S. Cl.
CPC ........ *G06F 13/4282* (2013.01); *G06F 13/382* (2013.01); *G06F 13/4068* (2013.01)

(58) Field of Classification Search
None
See application file for complete search history.

(56) References Cited

U.S. PATENT DOCUMENTS

| 7,413,129 B2 | 8/2008 | Fruhauf |
| 7,836,239 B2 * | 11/2010 | Duval ................. G06F 13/4081 |
| | | 710/300 |
| 2006/0106962 A1 | 5/2006 | Woodbridge et al. |
| 2007/0239924 A1 | 10/2007 | Foo et al. |
| 2008/0022029 A1 | 1/2008 | Chang et al. |

(Continued)

FOREIGN PATENT DOCUMENTS

KR    20070056253 A    6/2007

OTHER PUBLICATIONS

International Search Report and Written Opinion received for corresponding Patent Cooperation Treaty Application No. PCT/IB2012/056954, dated Nov. 26, 2013, 13 pages.

(Continued)

*Primary Examiner* — Cheng-Yuan Tseng
(74) *Attorney, Agent, or Firm* — Mintz Levin Cohn Ferris Glovsky and Popeo, P.C.

(57) ABSTRACT

It is inter alia disclosed to determine a type of a second apparatus being connected to a data interface of the first apparatus based on a state of an identification pin of the data interface, the data interface further comprising at least one data pin, wherein the type of the second apparatus relates to a communication via the at least one data pin, to check whether the second apparatus is configured to perform a further communication via the identification pin, and if said checking yields a positive result, to enable the further communication via the identification pin.

20 Claims, 8 Drawing Sheets

(56) References Cited

U.S. PATENT DOCUMENTS

2008/0140887 A1   6/2008   Gallant et al.
2010/0169534 A1   7/2010   Saarinen et al.

OTHER PUBLICATIONS

"STOTGO4E—USB-OTG Full-speed Transceiver," ST, http://www.st.com/content/ccc/resource/technical/document/datasheet/6e/85/a9/f0/e1/81/42/f6/CD00085098.pdf/files/CD00085098.pdf/jcr:content/translations/en.CD00085098.pdf, Revision 3, Oct. 2006.

* cited by examiner

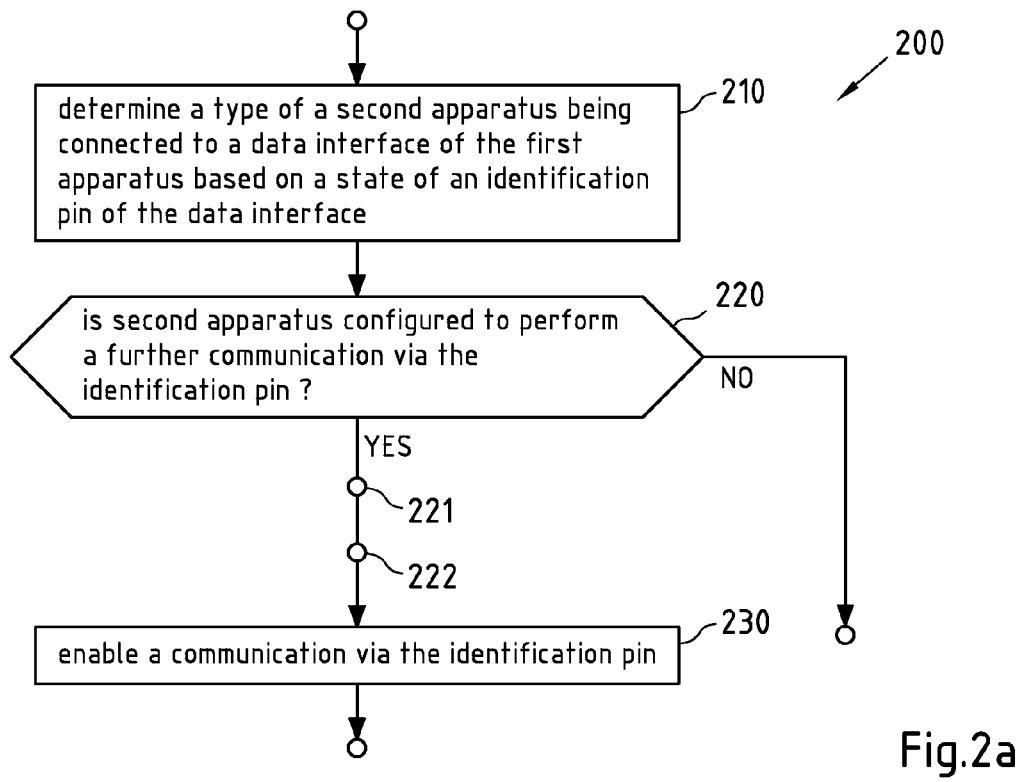
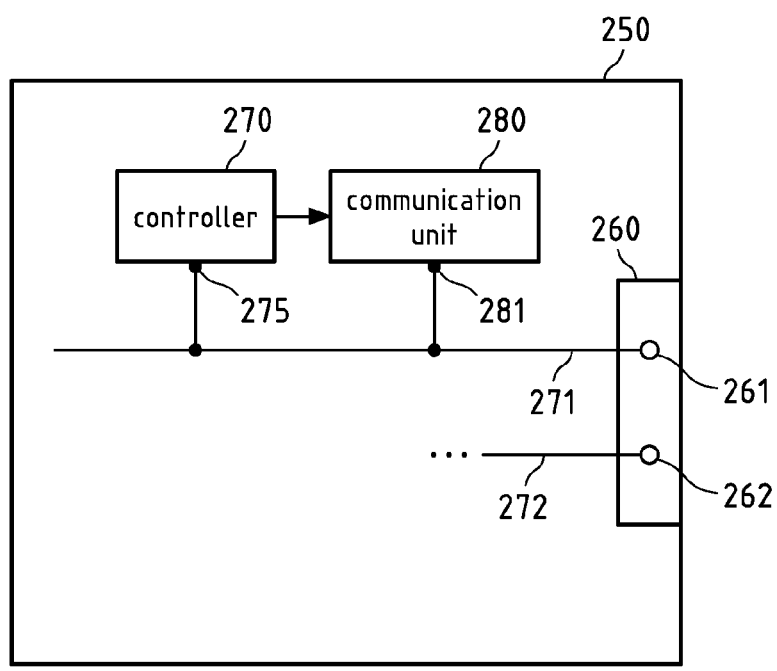

SERIAL PROTOCOL OVER DATA INTERFACE

RELATED APPLICATION

This application was originally filed as PCT Application No. PCT/IB2012/056954 filed Dec. 4, 2012.

FIELD

Embodiments of this invention relate to apparatuses comprising a data interface.

BACKGROUND

Serial or parallel data interfaces are known for connecting different apparatuses to each other. For instance, Universal Serial Bus (UBS) interfaces are used at a plurality of apparatuses.

Such data interfaces may comprise an identification which might be used to negotiate the device and host role between apparatuses.

SUMMARY OF SOME EMBODIMENTS OF THE INVENTION

Improving the use of the identification pin may be desirable.

According to a first exemplary embodiment of a first aspect of the invention, an apparatus is disclosed, the apparatus comprises a data interface comprising an identification pin and at least one data pin, a controller configured to determine a type of a second apparatus being connected to the data interface based on a state of the identification pin of the data interface, wherein the type of the second apparatus relates to a communication via the at least one data pin and configured to check whether the second apparatus is configured to perform a further communication via the identification pin, and if said checking yields a positive result, configured to enable the further communication via the identification pin.

According to a second exemplary embodiment of a first aspect of the invention, a method is disclosed, the method comprising determining a type of a second apparatus being connected to a data interface of the first apparatus based on a state of an identification pin of the data interface, the data interface further comprising at least one data pin, wherein the type of the second apparatus relates to a communication via the at least one data pin, checking whether the second apparatus is configured to perform a communication via the identification pin, and if said checking yields a positive result, enabling the further communication via the identification pin.

According to a third exemplary embodiment of a first aspect of the invention, an apparatus is disclosed, which is configured to perform the method according to the first aspect of the invention, or which comprises data interface means comprising an identification pin and at least one data pin, and controller means for determining a type of second apparatus being connected to the data interface based on a state of the identification pin of the data interface, wherein the type of the second apparatus relates to a communication via the at least one data pin, and for checking whether the second apparatus is configured to perform a further communication via the identification pin, and if said checking yields a positive result, for enabling the further communication via the identification pin.

According to a fourth exemplary embodiment of a first aspect of the invention, an apparatus is disclosed, comprising at least one processor and at least one memory including computer program code, the at least one memory and the computer program code configured to, with the at least one processor, cause the apparatus at least to perform the method according to the first aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fifth exemplary embodiment of a first aspect of the invention, a computer program is disclosed, comprising program code for performing the method according to the first aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a sixth exemplary embodiment of a first aspect of the invention, a computer-readable medium is disclosed, having a computer program according to a first aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

In the following, features and embodiments pertaining to all of these above-described aspects of the invention will be briefly summarized.

As an example, the data interface may comprise at least one further pin which may for instance represent a power supply pin and a ground pin and/or any other well suited pin. The at least one data pin might be configured to be used for a serial data communication, wherein, if said data interface represents a USB interface, the at least one data pin may represent a D+ and D− data pin, or, as a further example, the at least one data pin might represent a plurality of data pins being configured to be used for a parallel data communication. For instance, the wording pin may be understood in a way that a pin of the data interface represents any type of connector of a data interface. This may hold throughout the complete description.

As an example, the identification pin might be used for device role (host/device) identification purposed.

The apparatus according to the first aspect of the invention will be denoted as first apparatus.

The first apparatus comprises a controller being connected to the identification pin. Furthermore, apparatus comprises a communication unit configured to perform a communication via the identification pin. For instance, this communication via the identification pin might represent a unidirectional communication for transmitting data from the apparatus via the identification pin to a second apparatus being connected to the data interface (and being connected to the identification pin) or a unidirectional communication for receiving data from a second apparatus being connected to the data interface (and being connected to the identification pin) or a bidirectional communication for transmitting data to and/or receiving data from a second apparatus being connected to the data interface (and being connected to the identification pin).

The controller is configured to determine a type of a second apparatus being connected to the data interface based on a state of the identification pin of the data interface, wherein the type of the second apparatus relates to a communication via the at least one data pin. For instance, the second apparatus may comprise a data interface which may also basically correspond to the data interface of the first apparatus which comprises an identification pin and at least one further date pin and represents a compatible data interface with respect to the data interface of the first apparatus. Thus, the second apparatus can be connected via its data interface to the data interface of the first apparatus in order to connect the first apparatus and the second apparatus to each other via the respective data interfaces.

For instance, said determining a type of second apparatus may comprise checking whether the type of the second apparatus corresponds to a type of apparatus which is configured to perform a communication via the at least one data pin. As an example, if said data interface represents a USB compatible interface and the second apparatus being connected to the data interface represents a compatible apparatus, it might be determined based on the state of the identification pin that the second apparatus represents a USB compatible apparatus (e.g., a USB OTG compatible apparatus), and then the checking whether this determined type of the second apparatus relates to a communication via the at least one data pin may yield in a positive result, since it is possible to perform a communication via the at least one data pin (i.e., the D+ and D− pins of the USB compatible data interface) of the data interface.

It has to be understood, for instance, that the data interface is not limited to USB data interfaces. As an example, any other well-suited data interface being configured to perform a serial or parallel data communication via the at least on data pin may also be used. Thus, in step, it is checked based on the determined type of the second apparatus whether the second apparatus is configured to perform a communication via the at least one data pin.

This state of the identification may represent an electrical state of an electrical quantity at the identification pin and thus, for instance, said determining a type of the second apparatus being connected to the data interface might comprise detecting the electrical quantity at the identification pin. As an example, said electrical quantity might represent an electrical current at least partially flowing through the identification pin or a voltage at the identification pin. Furthermore, said determining the type of the second apparatus may further depend on the voltage of a power supply pin of the data interface. For instance, if the data interface represents a USB compatible interface, said determining the type of the second apparatus may further depend on the VBUS of the data interface.

As an example, the type of a second apparatus might be determined based on a negotiation between the first apparatus and the second apparatus via the identification pin, or the first apparatus might receive an electrical signal from the second apparatus after the second apparatus is connected to the data interface, wherein this electrical signal is indicative of the type of the second apparatus. For instance, said type of the second apparatus might represent a type of at least one predefined type, wherein one type of the at least one predefined type might represent a type which is configured to perform a communication via the at least one data pin.

Furthermore, as an example, the at least one predefined type might comprise further types, e.g. whether the second apparatus is configured to perform a communication via the identification pin.

Furthermore, the controller of the first apparatus is configured to check whether the second apparatus is configured to perform a further communication via the at least one data pin. As an example, this checking may be performed based on an electrical state at the identification pin. For instance, this checking may only be performed if the type of second apparatus was determined to represent a type relating to a communication via the at least one data line. As an example, in this case it may be enabled that a communication via the at least one data pin can possible and that the further communication via the identification can be possible. Or, as another example, this checking may also be performed if the type of second apparatus was determined not to represent a type relating to a communication via the at least one data line. In this case the communication via the identification pin may be used with respect to a second apparatus which is not suited to communicate via the at least one data pin, wherein this may for instance be relevant for accessory devices. Accordingly, due to determining the type of the second apparatus, it may be possible to adapt the data communication in an appropriate way.

If the checking yields a positive result, the controller enables the further communication via the identification pin of the data interface. For instance, this may be performed immediately after the checking yields a positive result or at a later stage.

For instance, said controller might send a signal to the communication unit in order to enable the further communication via the identification pin. As an example, said signal might represent a bias current provided to the communication unit.

The communication unit is configured to perform the further communication via the identification pin. This communication represents a serial data communication.

Accordingly, for instance, since it has been detected that the second apparatus is configured to perform a further communication via the identification pin, and under the example assumption that the type of the second apparatus was determined to represent a type relating to a communication via the at least one data pin, it may be allowed that a first communication may be performed between the first apparatus and the second apparatus via the at least one data pin of the data interface, wherein a second communication (i.e., the further communication) may be performed between the first apparatus and the second apparatus via the identification pin when this communication is enabled. This first and second communication may for instance be performed simultaneously.

As an example, an USB compliant serial communication may be performed via the at least one data pin and, simultaneously, the communication via the identification pin might be performed.

As an example, this further communication via the identification pin might be performed in a way that it does not disturb a USB communication and/or another communication via the ID pin. For instance, the communication via the identification pin might be based on signal which is superposed or overlayed on a USB compatible signal (if present) or another (e.g. further) electrical signal at the identification pin, wherein this superposed or overlayed signal does not change the status of the USB compatible signal (or the status of the further electrical signal). For instance, this USB compatible signal might represent a signal on the identification pin indicating the device role. Thus, for instance, it may be achieved that the communication via the identification pin is performed in a way that the USB compatible signal is not disturbed, e.g., the signal at the identification pin is still indicative on the device role.

According to an exemplary embodiment of the first aspect of the invention, said determining a type of the second apparatus is based on detecting an electrical quantity at the identification pin.

According to an exemplary embodiment of the first aspect of the invention, said electrical quantity is one of an electrical current flowing at least partially through the identification pin and a voltage at the identification pin.

According to an exemplary embodiment of the first aspect of the invention, said data interface represents a Universal Serial Bus (USB) interface.

For instance, said USB compatible data interface may represent a USB OTG compatible interface.

According to an exemplary embodiment of the first aspect of the invention, it is proposed to detect an electrical signal received at the identification pin being indicative whether the identification pin is available for communication and determining whether the identification pin is available for communication based on the detected electrical signal.

Thus, as an example, said checking whether the second apparatus is configured to perform a further communication via the identification pin may comprise said detecting an electrical signal received at the identification pin being indicative whether the identification pin is available for communication and determining whether the identification pin is available for communication based on the detected electrical signal.

Or, as another example, said checking whether the second apparatus is configured to perform a further communication via the identification pin may represent a separate checking compared to said detect an electrical signal received at the identification pin being indicative whether the identification pin is available for communication and determining whether the identification pin is available for communication based on the detected electrical signal. For instance, said checking whether the second apparatus is configured to perform a further communication via the identification pin may represent a check whether the second apparatus is basically adapted to perform the further communication via the identification pin, wherein this basic functionality for communication via the identification pin may be enabled and disabled, wherein the second apparatus may be configured to indicate whether this basic functionality is actually available or not by means of said electrical signal at the identification pin. Thus, for instance, only if the checking whether the second apparatus is configured to perform a further communication via the identification pin yields a positive result and if it is determined that the identification pin is available for communication based on the detected electrical signal, the further communication via the identification may be enabled by the first apparatus.

According to an exemplary embodiment of the first aspect of the invention, said determining whether the identification pin is available for communication based on the detected electrical signal comprises: monitoring at least one electrical quantity of the electrical signal at the identification pin, determining whether an electrical state of an electrical quantity of the at least one monitored electrical quantity is detected which corresponds to an electrical state of at least one predefined electrical state, and if a predefined electrical state is determined, determining whether the identification pin is available for communication based on the predefined electrical state.

According to an exemplary embodiment of the first aspect of the invention, said at least one electrical quantity is at least one of a current flowing at least partially through the identification pin and a voltage at the identification pin, and wherein said at least one predefined electrical state is at least one of: at least one predefined voltage offset occurs at the voltage at the identification pin, at least one predefined current offset occurs at the current flowing at least partially through the identification pin, the voltage at the identification pin exceeds at least one voltage level threshold, and the current flowing at least partially through the identification pin exceeds at least one current level threshold.

According to an exemplary embodiment of the first aspect of the invention, said determining whether the identification pin is available for communication based on the detected electrical signal yields in a positive result if at least one of the following at least one predefined electrical state is detected: the voltage at the identification pin is less than a predefined voltage level threshold, and at least one predefined voltage offset occurs at the voltage at the identification pin, the current flowing at least partially through the identification pin is less than at least one current level threshold, at least one predefined current offset occurs at the current flowing at least partially through the identification pin.

According to an exemplary embodiment of the first aspect of the invention, said determining whether the identification pin is available for communication based on the detected electrical signal yields in a negative result if at least one of the following at least one predefined electrical state is detected: the voltage at the identification pin is higher than a predefined voltage level threshold, and at least one predefined voltage offset occurs at the voltage at the identification pin, the current flowing at least partially through the identification pin is higher than at least one current level threshold, at least one predefined current offset occurs at the current flowing at least partially through the identification pin.

According to an exemplary embodiment of the first aspect of the invention, said monitoring at least one electrical quantity of the electrical signal at the identification pin is performed during said communication via the identification pin.

According to an exemplary embodiment of the first aspect of the invention, it is proposed to disable the communication via the identification pin if said determining whether the identification pin is available for communication based on the detected electrical signal yields in a negative result.

According to an exemplary embodiment of the first aspect of the invention, said monitoring at least one electrical quantity of the electrical signal at the identification pin is performed when said communication via the identification pin is disabled.

According to an exemplary embodiment of the first aspect of the invention, it is proposed to enable the communication via the identification pin if said determining whether the identification pin is available for communication based on the detected electrical signal yields in a positive result.

According to an exemplary embodiment of the first aspect of the invention, it is proposed, after determining a type of second apparatus being connected to a data interface of the first apparatus based on a state of an identification pin of the data interface is performed, to wait for a first predefined time interval before said communication via the identification pin is enabled.

According to an exemplary embodiment of the first aspect of the invention, said communication via the identification pin is enabled for a second predefined time interval.

According to an exemplary embodiment of the first aspect of the invention, said determining a type of the second apparatus is based on detecting an electrical quantity at the identification pin, and wherein said waiting for a first predefined time interval is triggered when it is detected that the electrical quantity exceeds a predefined threshold.

According to an exemplary embodiment of the first aspect of the invention, said communication via the identification pin comprises one of: alternating between at least two voltage levels, and alternating between at least two current levels.

According to a first exemplary embodiment of a second aspect of the invention, a second apparatus is disclosed, the second apparatus comprises a data interface comprising an identification pin and at least one data pin, a controller configured to determine a type of a first apparatus being connected to a data interface of the second apparatus based on a state of an identification pin of the data interface, the data interface further comprising at least one data pin, wherein the type of the second apparatus relates to a communication via the at least one data pin, wherein the controller is configured to check whether the first apparatus is configured to perform a further communication via the identification pin, and if said checking yields a positive result, to provide an electrical signal being indicative that the identification pin is available for further communication at the identification pin and enabling the further communication via the identification pin.

According to a second exemplary embodiment of a second aspect of the invention, a method is disclosed (which may be performed by the second apparatus), the method comprising determining a type of a first apparatus being connected to a data interface of the second apparatus based on a state of an identification pin of the data interface, the data interface further comprising at least one data pin, wherein the type of the second apparatus relates to a communication via the at least one data pin, checking whether the first apparatus is configured to perform a communication via the identification pin, and if said checking yields a positive result, providing an electrical signal being indicative that the identification pin is available for further communication at the identification pin and enabling the further communication via the identification pin.

According to a third exemplary embodiment of a second aspect of the invention, a second apparatus is disclosed, which is configured to perform the method according to the second aspect of the invention, or which comprises a data interface means comprising an identification pin and at least one data pin, controller means for determining a type of a first apparatus being connected to a data interface of the second apparatus based on a state of an identification pin of the data interface, the data interface further comprising at least one data pin, wherein the type of the second apparatus relates to a communication via the at least one data pin, and controller means for checking whether the first apparatus is configured to perform a communication via the identification data pin, and if said checking yields a positive result, for providing an electrical signal being indicative that the identification pin is available for further communication at the identification pin and enabling the further communication via the identification pin.

According to a fourth exemplary embodiment of a second aspect of the invention, an apparatus is disclosed, comprising at least one processor and at least one memory including computer program code, the at least one memory and the computer program code configured to, with the at least one processor, cause the apparatus at least to perform the method according to the second aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fifth exemplary embodiment of a second aspect of the invention, a computer program is disclosed, comprising program code for performing the method according to the second aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a sixth exemplary embodiment of a second aspect of the invention, a computer-readable medium is disclosed, having a computer program according to a second aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

The controller of the second apparatus may determine a type of an apparatus being connected to the data interface based on a state of an identification pin of the data interface, wherein this may correspond or be performed based on determining a type of an apparatus explained with respect to the first aspect of the invention.

Furthermore, if the first apparatus being connected to the data interface of the second apparatus is configured to perform a communication via the identification pin of the data interface, it is proposed to provide an electrical signal being indicative that the identification pin of the second apparatus is available for communication via the identification pin of the data interface of the second apparatus. As an example, this checking whether the first apparatus is configured to perform a communication via the identification pin may represent a check whether the first apparatus is basically adapted to perform the further communication via the identification pin, wherein this basic functionality for communication via the identification pin may be enabled and disabled.

For instance, this electrical signal being indicative that the identification pin is available for communication may represent an electrical signal which is superposed on a further electrical signal provided or received on the identification pin of the data interface, wherein this further electrical signal may represent a signal in compliance with a standard of the data interface, wherein the electrical signal being indicative that the identification pin is available for communication is provided may be superposed on the further electrical signal (if there is a further signal on the identification pin) in a way that the further electrical signal is not disturbed, i.e., that the information of the further electrical signal is still present such that the combined electrical signal comprising the further electrical signal still comprises the information of the further electrical signal.

For instance, the second apparatus may comprise a signal generator which is connected to the identification pin of the data interface and is configured to provide said electrical signal being indicative that the identification pin is available for communication. Furthermore, as an example, said signal generator may be part of the communication unit of the second apparatus or may represent a separate entity.

According to an exemplary embodiment of the second aspect of the invention, said providing an electrical signal being indicative that the identification pin is available for further communication at the identification pin comprises lowering voltage at the identification pin.

For instance, an initial voltage at the identification pin may be lowered by a predefined voltage level offset. For instance, said predefined voltage level offset may be chosen in such a way that the voltage shift does not disturb an information carried by the initial voltage at the identification pin. Thus, for instance, the initial voltage may be considered to represent the above mentioned further signal or may comprise the further signal.

According to an exemplary embodiment of the second aspect of the invention, said second apparatus may comprise a voltage pull-up element placed between the identification pin and a voltage source, wherein said providing an electrical signal being indicative that the identification pin is available for further communication at the identification pin comprises disconnecting the voltage pull-up element from identification pin.

According to an exemplary embodiment of the second aspect of the invention, it is proposed to provide an electrical signal being indicative that the identification pin is not available for further communication at the identification pin and disabling the further communication via the identification pin.

According to an exemplary embodiment of the second aspect of the invention, the second apparatus comprises a voltage pull-up element placed between the identification pin and a voltage source, wherein said providing an electrical signal being indicative that the identification pin is not available for further communication at the identification pin comprises connecting the voltage pull-up element from identification pin.

According to an exemplary embodiment of the second aspect of the invention, the data interface represents a USB compatible data interface.

For instance, said USB compatible data interface may represent a USB OTG compatible interface.

According to an exemplary embodiment of the second aspect of the invention, it is proposed to perform a communication via the at least one data pin of the data interface.

For instance, this communication may be performed together with a connected first apparatus, wherein this communication may for instance be performed simultaneously to a communication performed via the identification pin (if said communication is enabled).

Other features of all aspects of the invention will be apparent from and elucidated with reference to the detailed description of embodiments of the invention presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

BRIEF DESCRIPTION OF THE FIGURES

In the figures show:

FIG. 2a: a flowchart of a first example embodiment of a method according to a first aspect of the invention;

FIG. 2b: a second example embodiment of an apparatus according to a first aspect of the invention;

DETAILED DESCRIPTION OF EMBODIMENTS OF THE INVENTION

Figure 1A:
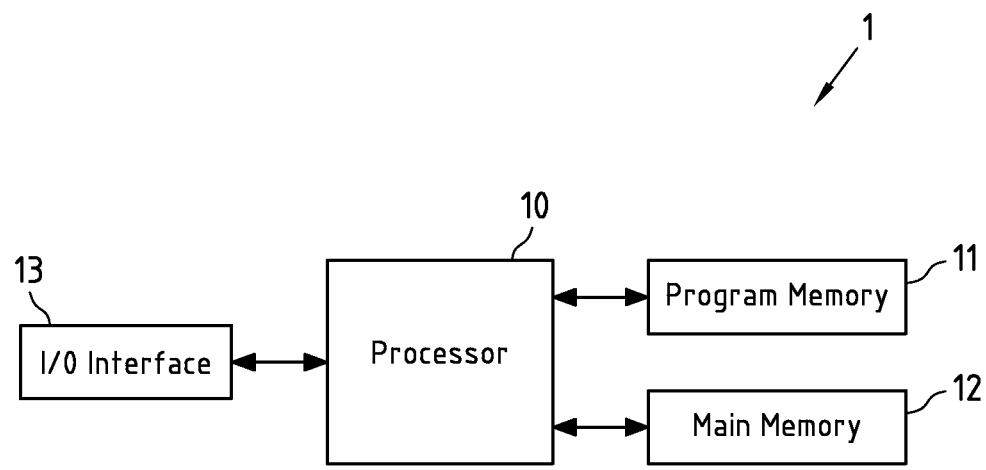
FIG. 1: A first example embodiment of an apparatus according to a first and/or second aspect of the invention.

FIG. 1a schematically illustrates components of an apparatus 1 according to an embodiment of the invention. Apparatus 1 may for instance be an electronic device that is for instance capable to provide phone functionalities. For instance, apparatus 1 may be or may form a part of a terminal, wherein this terminal may represent a mobile terminal.

According to a first aspect of the invention apparatus 1 may for instance be configured to determine a type of a second apparatus (not depicted in FIG. 1a) being connected to a data interface 13 of the first apparatus 13 based on a state of an identification pin of the data interface 13, the data interface further comprising at least one data pin, wherein the type of the second apparatus related to a communication via the at least one data pin, and may be configured to check whether the second apparatus is configured to perform a further communication via the identification pin, and may configured, if said checking yields a positive result, to enable the further communication via the identification pin.

According to a second aspect of the invention apparatus 1 may for instance be configured to determine a type of second apparatus (not depicted in FIG. 1a) being connected to a data interface of the first apparatus based on a state of an identification pin of the data interface, the data interface further comprising at least one data pin, wherein the type of the second apparatus related to a communication via the at least one data pin, and may be configured to check whether the second apparatus is configured to perform a communication via the identification pin, and may be configured, if said checking yields a positive result, to provide an electrical signal being indicative that the identification pin is available for further communication at the identification pin and enabling the further communication via the identification pin.

For instance, the wording pin may be understood in a way that a pin of the data interface represents any type of connector of a data interface. This may hold throughout the complete description.

Apparatus 1 may for instance be embodied as a module. Non-limiting examples of apparatus 1 are a mobile phone (e.g. a smartphone), a personal digital assistant, a portable multimedia (audio and/or video) player, and a computer (e.g. a laptop or desktop computer).

Apparatus 1 comprises at least one processor 10 (only one processor is depicted in FIG. 1a), which may for instance be embodied as at least one microprocessor, at least one Digital Signal Processor (DSP) or at least one Application Specific Integrated Circuit (ASIC), to name but a few non-limiting examples. The at least one processor 10 executes program code stored in program memory 11, and uses main memory 12 as a working memory, for instance to at least temporarily store intermediate results, but also to store for instance pre-defined and/or pre-computed databases. Some or all of memories 11 and 12 may also be included into the at least one processor 10. Memories 11 and/or 12 may for instance be embodied as Read-Only Memory (ROM), Random Access Memory (RAM), to name but a few non-limiting examples. One of or both of memories 11 and 12 may be fixedly connected to the at least one processor 10 or removable from the at least one processor 10, for instance in the form of a memory card or stick.

The at least one processor 10 further controls an input/output (I/O) interface 13 which represent the above mentioned data interface 13, via which the at least one processor receives or provides information to other functional units.

For instance, the data interface 13 might represent a parallel or serial interface comprising an identification pin and at least one data pin. As an example, the identification pin might be used for device role (host/device) identification purposed. It has to be understood that the data interface 13 might for instance comprise further pins, e.g. a power pin and a ground pin. As an example, the data interface 13 might represent an interface being compatible with the Universal Serial Bus (USB), wherein, as a further example, the data interface 13 might be compatible with the USB On The Go (OTG) standard.

As an example, the data interface 13 might represent or comprise a connector (e.g. a receptacle or a plug) which is configured to be connected to a respective connector in order to connect the apparatus 1 to a further apparatus, e.g., the above-mentioned second apparatus via the data interface 13.

As will be described below, the at least one processor 10 is at least capable to execute program code for providing the any aspect of the invention. However, the at least one processor 10 may of course possess further capabilities. Processor 10 may additionally or alternatively be capable of controlling operation of a portable communication and/or multimedia device.

Apparatus 1 of FIG. 1a may further comprise components such as a user interface, for instance to allow a user of apparatus 1 to interact with the at least one processor 10, or an antenna with associated radio frequency (RF) circuitry to enable apparatus 1 to perform wireless communication. As an example, apparatus 1 may comprise one or more RF circuitry configured to perform cellular wireless communication and/or WIFI wireless communication (e.g., WLAN) and/or short range wireless communication (e.g., Bluetooth) and/or near field wireless communication (e.g., based on RFID), wherein the one or more RF circuitry may be connected to at least one antenna.

The circuitry formed by the components of apparatus 1 may be implemented in hardware alone, partially in hardware and in software, or in software only, as further described at the end of this specification.

Figure 1B:
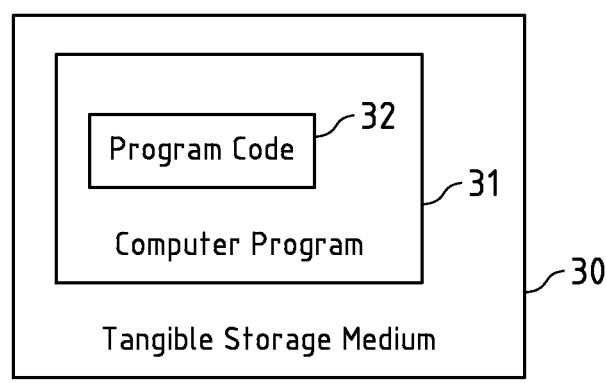

FIG. 1b is a schematic illustration of an embodiment of a tangible storage medium 20 according to the invention. This tangible storage medium 20, which may in particular be a non-transitory storage medium, comprises a program 21, which in turn comprises program code 22 (for instance a set of instructions). Realizations of tangible storage medium 20 may for instance be program memory 12 of FIG. 1a. Consequently, program code 22 may for instance implement the flowcharts of FIGS. 2a, 4a, 4b, 5 and 8 associated with an aspect of the invention discussed below.

FIG. 2a shows a flowchart 200 of a method according to a first embodiment of a first aspect of the invention. This method 200 will be explained in conjunction with the first example embodiment of an apparatus 250 according to the first aspect of the invention depicted in FIG. 2b Apparatus 250 comprises a data interface 260 which may basically correspond to the data interface 13 depicted in FIG. 1a. Thus, data interface 260 comprises an identification pin 261 and at least one data pin 262. Furthermore, the data interface 260 may comprise further pin which may for instance represent a power supply pin and a ground pin and/or any other well suited pin (not depicted in FIG. 2b). The at least one data pin 262 might be configured to be used for a serial data communication, wherein, if said data interface 260 represents a USB interface, the at least one data pin 262 may represent a D+ and D− data pin, or, as a further example, the at least one data pin 262 might represent a plurality of data pins being configured to be used for a parallel data communication.

As an example, the identification pin 261 might be used for device role (host/device) identification purposed.

Apparatus 250 comprises a controller 270 being connected to the identification pin 261 via an identification line 271. Furthermore, apparatus 250 comprises a communication unit 280 configured to perform a communication via the identification pin 261. For instance, this communication via the identification pin might represent a unidirectional communication for transmitting data from the apparatus 250 via the identification pin 261 to a second apparatus being connected to the data interface 260 (and being connected to the identification pin 261) or a unidirectional communication for receiving data from a second apparatus being connected to the data interface 260 (and being connected to the identification pin 261) or a bidirectional communication for transmitting data to and/or receiving data from a second apparatus being connected to the data interface 260 (and being connected to the identification pin 261).

In a step 210, the controller 270 is configured to determine a type of a second apparatus being connected to the data interface 260 based on a state of the identification pin 261 of the data interface 260. The second apparatus (not depicted in FIG. 2b) may comprise a data interface which may also basically correspond to the data interface 13 depicted in FIG. 1a which comprises an identification pin and at least one further date pin and represents a compatible data interface with respect to the data interface 261 of apparatus 250. Thus, the second apparatus can be connected via its data interface to the data interface 260 of the apparatus 250 in order to connect the apparatus 250 and the second apparatus to each other via the respective data interfaces. Furthermore, said determining the type of the second apparatus may further depend on the voltage of a power supply pin of the data interface. For instance, if the data interface represents a USB compatible interface, said determining the type of the second apparatus may further depend on the VBUS of the data interface.

This state of the identification may represent an electrical state of an electrical quantity at the identification pin 261 and thus, for instance, said determining a type of the second apparatus being connected to the data interface 260 might comprise detecting the electrical quantity at the identification pin 261. As an example, said electrical quantity might represent an electrical current at least partially flowing through the identification pin 261 or a voltage at the identification pin 261.

In the sequel, apparatus 250 is denoted as first apparatus 250.

As an example, in step 210 the type of a second apparatus might be determined based on a negotiation between the first apparatus and the second apparatus via the identification pin 261, or the first apparatus 210 might receive an electrical signal from the second apparatus after the second apparatus 220 is connected to the data interface 260, wherein this electrical signal is indicative of the type of the second apparatus. For instance, said type of the second apparatus might represent a type of at least one predefined type, wherein one type of the at least one predefined type might represent a type which is configured to perform a communication via the at least one data pin 262. Furthermore, as an example, the at least one predefined type might comprise further types, e.g. whether the second apparatus is configured to perform a communication via the identification pin.

For instance, said determining a type of second apparatus in step 210 may comprise checking whether the type of the second apparatus 220 corresponds to a type of apparatus which is configured to perform a communication via the at least one data pin. As an example, if said data interface 260 represents a USB compatible interface and the second apparatus being connected to the data interface 260 represents a compatible apparatus, it might be determined based on the state of the identification pin that the second apparatus represents a USB compatible apparatus (e.g., a USB OTG compatible apparatus), and then the checking whether this determined type of the second apparatus relates to a communication via the at least one data pin may yield in a positive result, since it is possible to perform a communication via the at least one data pin (i.e., the D+ and D− pins of the USB compatible data interface) of the data interface 260.

It has to be understood, for instance, that the data interface 260 is not limited to USB data interfaces. As an example, any other well-suited data interface being configured to perform a serial or parallel data communication via the at least on data pin may also be used. Thus, in step, it is checked based on the determined type of the second apparatus whether the second apparatus is configured to perform a communication via the at least one data pin.

In step 220, the controller 270 of the first apparatus 250 is configured to check whether the second apparatus is configured to perform a further communication via the identification pin. As an example, this checking in step 220 may be performed based on an electrical state at the identification pin. For instance, this checking in step 220 may only be performed if the type of second apparatus was determined to represent a type relating to a communication via the at least one data line. As an example, in this case it may be enabled that a communication via the at least one data pin can possible and that the further communication via the identification can be possible. Or, as another example, this checking in step 220 may also be performed if the type of second apparatus was determined not to represent a type relating to a communication via the at least one data line. In this case the communication via the identification pin 361 may be used with respect to a second apparatus which is not suited to communicate via the at least one data pin, wherein this may for instance be relevant for accessory devices. Accordingly, due to determining the type of the second apparatus, it may be possible to adapt the data communication in an appropriate way.

If the checking in step 220 yields a positive result, the controller 270 enables the further communication via the identification pin 261 of the data interface 260 in accordance with step 230 depicted in FIG. 2a. For instance, this may be performed immediately after the checking yields a positive result or at a later stage. Reference signs 221 and 222 depicted in FIG. 2b indicate that there might be a further processing before communication via the identification pin 261 is enabled.

For instance, said controller 270 might send a signal to the communication unit 280 in order to enable the communication via the identification pin 261. As an example, said signal might represent a bias current provided to the communication unit 280.

The communication unit 280 is configured to perform the communication via the identification pin, e.g. as mentioned above with respect to apparatus 10 depicted in FIG. 1a. This communication represents a serial data communication.

Accordingly, as an example, if it has been determined in step 210 that the second apparatus is configured to perform a communication via the at least one data pin, it is allowed that a first communication may be performed between the first apparatus 260 and the second apparatus via the at least one data pin 262 of the data interface, wherein a second communication may be performed between the first apparatus 260 and the second apparatus via the identification pin when this communication is enabled in step 230. This first and second communication may be performed simultaneously.

As an example, an USB compliant serial communication may be performed via the at least one data pin 262 and, simultaneously, the communication via the identification pin 261 might be performed.

As an example, this communication via the identification pin 261 might be performed in a way that it does not disturb a USB communication and/or another communication via the ID pin. For instance, the communication via the identification pin might be based on signal which is superposed or overlayed on a USB compatible signal (if present) or another (e.g. further) electrical signal at the identification pin, wherein this superposed or overlayed signal does not change the status of the USB compatible signal (or the status of the further electrical signal). For instance, this USB compatible signal might represent a signal on the identification pin indicating the device role. Thus, for instance, it may be achieved that the communication via the identification pin is performed in a way that the USB compatible signal is not disturbed, e.g., the signal at the identification pin 261 is still indicative on the device role.

Figure 3:
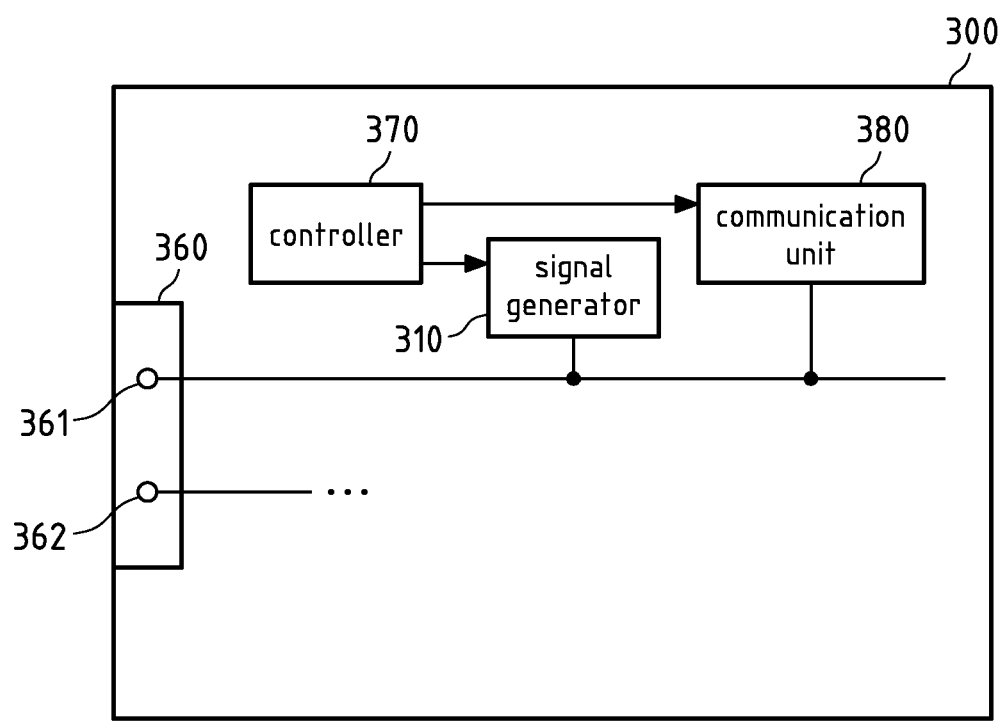
FIG. 3: a second example embodiment of an apparatus according to a second aspect of the invention.

FIG. 3 depicts a first example embodiment of an apparatus 300 according to the second aspect of the invention. This first example embodiment of an apparatus 300 will be explained in conjunction with the flowchart 500 of a first example embodiment of a method 500 according to the second aspect of the invention shown in FIG. 5. Apparatus 300 according to the second aspect of the invention will be denoted as second apparatus 300 in the sequel and may correspond to the second apparatus mentioned above. Furthermore, this method 500 will be explained with the example voltage diagram 600 which may represent an example voltage curve at the identification pin 361 of the data interface 360 of the second apparatus.

The second apparatus 300 comprises a data interface 360 which basically corresponds to the data interface 13 depicted in FIG. 1a and to data interface 261 depicted in FIG. 2b, i.e., data interface 360 comprises an identification pin 361 and at least one data pin 362.

Furthermore, the second apparatus 300 comprises a communication unit 380 which is configured to perform a communication via the identification pin 361. This communication unit 380 may correspond or be based on the communication unit 280 of the first apparatus 250. Thus, for instance, if the data interface 260 of the first apparatus 250 is connected to the data interface 360 of the second apparatus 300, the communication unit 380 of the second apparatus 300 might perform a communication via the identification pins 361, 261 of the data interfaces 360, 260 with the communication unit 280 of the first apparatus 260.

Figure 5:
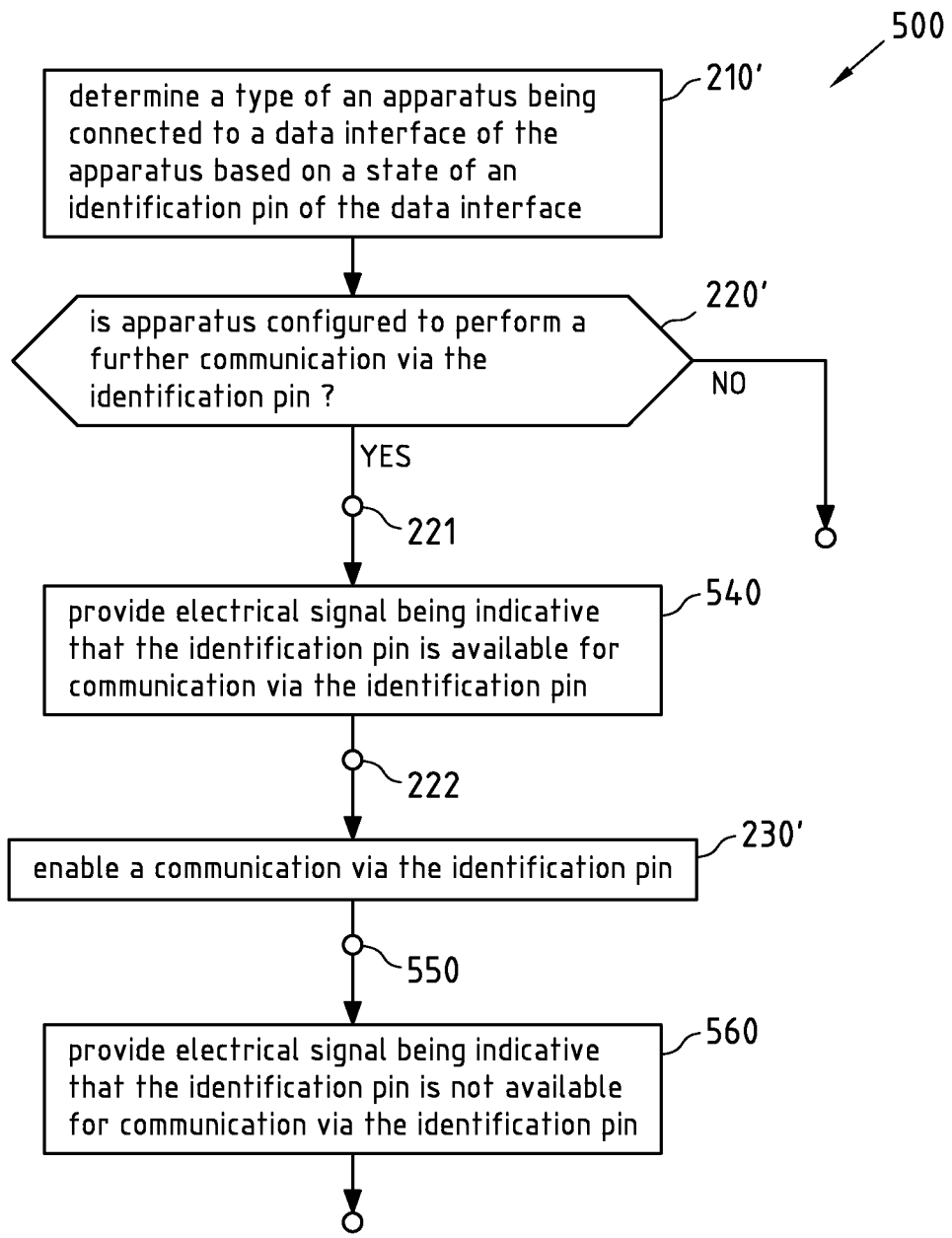
FIG. 5: a flowchart of a first example embodiment of a method according to a second aspect of the invention.

The second apparatus 300 further comprises a controller 370 which may be configured to perform at least one step of the method 500 depicted in FIG. 5. In a step 210' of method 500 the controller determines a type of an apparatus being connected to the data interface 360 based on a state of an identification pin 361 of the data interface, wherein this step 210' may correspond to step 210 of method 200 depicted in FIG. 2a. Thus, as an example, all explanations presented with respect to step 210 of method 200 may also hold for step 210' of method 500.

Furthermore, step 220' of method 500 may for instance correspond to step 220 of method 200. As an example, this checking in step 220' may be performed based on an electrical state at the identification pin 361. For instance, this checking 220' may only be performed if the type of second apparatus was determined to represent a type relating to a communication via the at least one data line 362 in step 210'. As an example, in this case it may be enabled that a communication via the at least one data pin 362 can possible and that the further communication via the identification 361 can be possible. Or, as another example, this checking in step 220' may also be performed if the type of second apparatus was determined not to represent a type relating to a communication via the at least one data line 362. In this case the communication via the identification pin may be used with respect to a second apparatus which is not suited to communicate via the at least one data pin 362, wherein this may for instance be relevant for accessory devices. Accordingly, due to determining the type of the second apparatus, it may be possible to adapt the data communication in an appropriate way.

As an example, this checking whether the first apparatus is configured to perform a communication in step 220' via the identification pin may represent a check whether the first apparatus is basically adapted to perform the further communication via the identification pin 361, wherein this basic functionality for communication via the identification pin 361 may be enabled and disabled.

If the apparatus being connected to the data interface 360 of the second apparatus 300 is configured to perform a further communication via the identification pin 361 of the data interface 360, the method 500 comprises providing an electrical signal being indicative that the identification pin 361 is available for communication via the identification pin 361 of the data interface 360 in a step 540. For instance, it has to be understood that step 540 may be performed immediately after the checking is performed in step 220', or at a later state, wherein further steps may be performed before the electrical signal being indicative that the identification pin 361 is available for communication is provided via the identification pin 361 in step 540.

For instance, this electrical signal being indicative that the identification pin 361 is available for communication may represent an electrical signal which is superposed on a further electrical signal provided or received on the identification pin 361 of the data interface, wherein this further electrical signal may represent a signal in compliance with a standard of the data interface, wherein the electrical signal being indicative that the identification pin 361 is available for communication is provided may be superposed on the further electrical signal (if there is a further signal on the identification pin 361) in a way that the further electrical signal is not disturbed, i.e., that the information of the further electrical signal is still present such that the combined electrical signal comprising the further electrical signal still comprises the information of the further electrical signal.

The second apparatus 300 comprises a signal generator 310 which is connected to the identification pin 361 of the data interface 360 and is configured to provide said electrical signal being indicative that the identification pin 361 is available for communication. Furthermore, as an example, said signal generator 310 may be part of the communication unit 380 of the second apparatus 300.

As a non-limiting example, said providing the electrical signal being indicative that the identification pin 361 is available at the identification pin 361 in step 540 might comprise lowering a voltage at the identification pin 361. For instance, an initial voltage at the identification pin may be lowered by a predefined voltage level offset. For instance, said predefined voltage level offset may be chosen in such a way that the voltage shift does not disturb an information carried by the initial voltage at the identification pin. Thus, for instance, the initial voltage may be considered to represent the above mentioned further signal or may comprise the further signal.

FIG. 5 depicts such an example of lowering the voltage at the identification pin 361 in step 540. For instance, it may be assumed that the further electrical signal may be associated with at least two different voltage levels, wherein in the example depicted in FIG. 5 only two voltage levels U1 (state low) and U2 (state high) are depicted, but it has to be understood that more than two voltage levels may be used for representing the further electrical signal. For instance, beginning at time t=0 it may be assumed that the voltage level of the further electrical signal is low (as an example, it may be another voltage level, i.e. the voltage level of the further electrical signal may represent another voltage level, e.g. high), i.e. U=U1 may hold at the identification pin 361. Thus, U1 might for instance be considered to represent the above-mentioned initial voltage. Then, at t=t1 said electrical signal being indicative that the identification pin is available for communication is provided at the identification pin 361 in accordance with step 540 which causes lowering the voltage at the identification pin 361 by a predefined voltage level offset 610, wherein this predefined voltage level offset 610 may be denoted as $\Delta U_1$ and wherein the lowered voltage level may be denoted as U1'. This predefined voltage level offset 610 $\Delta U_1$ is chosen in such a way that it does not change the state of the further electrical signal. For instance, said predefined voltage level offset 610 $\Delta U_1$ may depend on the voltage level of the first electrical signal and may be different for different voltage levels. This will be explained in the sequel with respect to an example of lowering the voltage at the identification pin a t=t3 depicted in FIG. 6. As another example, the predefined voltage level offset 610 $\Delta U_1$ may be independent on the voltage level of the further electrical signal.

Figure 6:
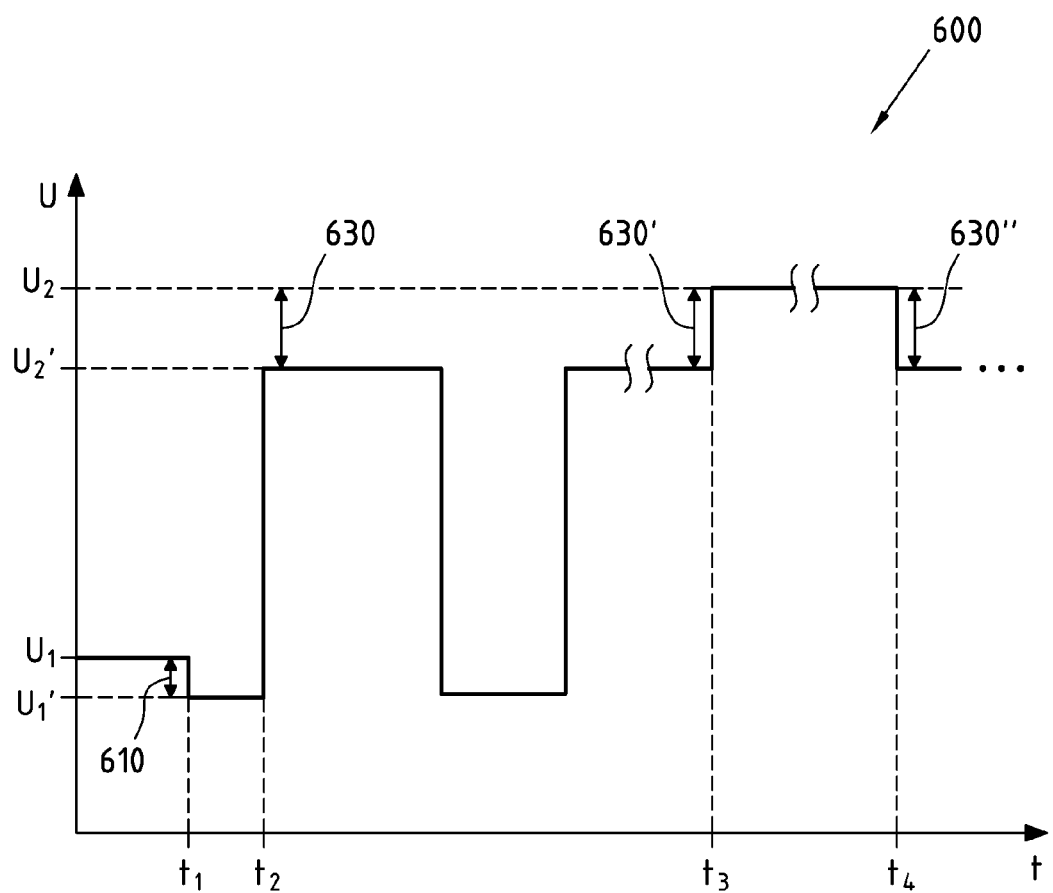
FIG. 6: an example voltage diagram according to the second aspect of the invention.

For instance, after t=t1 the communication via the identification pin 361 is enabled in accordance with step 230'. As an example, this communication may comprise switching the voltage of the further electrical signal at the identification pin between different voltage levels of the at least two different voltage levels, wherein FIG. 6 depicts as a non-limiting example switching the further electrical signal between low voltage level U1 and high voltage level U2. Since said electrical signal being indicative that the identification pin is available for communication via the identification pin 361 is still superposed on the further electrical signal, this may comprise lowering the voltage of the further electrical signal even if the further electrical signal is switched to another voltage than the voltage level at t=t1. Thus, for instance, as exemplarily depicted in FIG. 6, when the further electrical signal is switched to the high voltage level U2 at t=t2, this voltage level U2 is lowered by a predefined voltage level offset 630 (which might be denoted as $\Delta U_2$) such that the voltage level at the identification pin 361 represents a lowered voltage U2' which still indicates that the identification pin 361 is available for communication. For instance, this predefined voltage level offset $\Delta U_2$ used for lowering the voltage at the identification pin with respect to the high voltage level U2 might represent the same predefined voltage level offset used for lowering the voltage with respect to the low voltage level U1, i.e., $\Delta U_2 = \Delta U_1$ might hold, wherein, as an example, the predefined voltage level offset for lowering the voltage at the identification pin might be the same independently from the voltage level at the identification pin, or, as another example, the predefined voltage level offset $\Delta U_2$ used for lowering the voltage at the identification pin with respect to the high voltage level U2 might differ from the predefined voltage level offset used for lowering the voltage with respect to the low voltage level U1, i.e., $\Delta U_2 \neq \Delta U_1$ may hold.

Accordingly, as an example, the voltage provided by the communication unit 380 being associated with the identification pin 361 (i.e., said further electrical signal) might be alternated between at least two different voltage levels U1, U2 in order to provide a communication via the identification pin at step 230' of method 500, wherein, as an example, this voltage is lowered in accordance with a respective predefined voltage level offset in order to indicate that the identification pin 361 is available for communication, as exemplarily depicted between t1 and t3 in FIG. 6.

Thus, the second apparatus 300 may perform step 540 if it is desired that a communication shall be performed via the identification pin 361 of the data interface.

Furthermore, if the type of apparatus being connected to the data interface 360 of the second apparatus 300 is configured to perform a communication via the at least one data pin 361 of the data interface 360, the method 500 enables a communication via the identification pin 361 in step 230' of method 500, wherein this may include that the controller 370 enables the communication unit 380 in order to perform a communication via the identification pin 361. This step 230' may correspond to step 230 of method 200 in FIG. 2a.

Furthermore, method 500 may comprise an optional step 560 that comprises providing a signal being indicative that the identification pin 361 is not available for communication at the identification pin 361. The signal generator 310 may be configured to provide said electrical signal being indicative that the identification pin 361 is not available for communication.

As a non-limiting example, said providing the electrical signal being indicative that the identification pin 361 is not available for communication via the identification pin 361 in step 540 might comprise raising a voltage at the identification pin 361. For instance, an initial voltage at the identification pin may be raised by a predefined voltage level offset. As an example, said initial voltage might represent a lowered voltage which has been lowered by a respective predefined voltage level offset in order to indicate that the identification pin is available for a communication via the identification pin. For instance, said predefined voltage level may be chosen in such a way that the voltage shift does not disturb an information carried by the initial voltage at the identification pin. Thus, for instance, the initial voltage may be considered to represent the above mentioned further signal or may comprise the further signal.

For instance, at t=t3 depicted in FIG. 3, it might be decided by the second apparatus that communication via the identification pin shall be disabled. As an example, this may be necessary since the protocol of the data interface 360 might need the identification pin for some kind of special purpose. Thus, at t=3 said signal being indicative that the identification pin 361 is not available for communication may be provided, as exemplarily depicted in FIG. 6, by raising the voltage at the identification pin 361 by a predefined voltage level offset 630' which corresponds to the predefined voltage level 630 $\Delta U_2$ used for lowering the voltage at the identification when the basic voltage level is U2 in accordance with the exemplary high state. Thus, the raised voltage level after t3 (until t4) corresponds to voltage U2 without any shift, wherein the voltage offset 630' at t=3 may indicate that the identification pin 361 is not longer available for communication.

Furthermore, as an example, in step 560 the voltage might be raised with respect to any voltage level at the identification pin, wherein an actual voltage might be associated with one voltage level of said at least two voltage levels, wherein the actual voltage might represent a lowered voltage as mentioned above. Thus, said raising the voltage with the predefined voltage level associated with the respective voltage level might represent shifting the voltage at the identification pin to the voltage associated with the actual voltage level of the first signal being actually provided at the identification pin. For instance, if said signal being indicative that the identification pin 361 is not available for communication via the identification pin 361 shall be provided at t2', the lowered voltage U1' may be raised up in accordance with the predefined voltage level offset $\Delta U_1$ in order to shift the voltage at the identification pin to U1.

For instance, at or after step 560, the communication via the identification pin 361 might be disabled (not depicted in FIG. 5).

As an example, at a later stage the method 500 might jump to reference sign 222 and might provide a electrical signal being indicative that the identification pin 361 is available for communication via the identification by providing this electrical signal at the identification pin 361, as mentioned above, wherein, as an example, with respect to FIG. 6, this is exemplarily depicted at t=t4 by lowering the voltage level at the identification pin 361 by a predefined voltage level offset $\Delta U_2$ 630" being associated with the actual voltage level U2 of the further signal. Then (or simultaneously), for instance, the communication via the identification pin is enabled and the method 500 may proceed as mentioned above.

Thus, for instance, the second apparatus 300 may control a communication via the identification pin 361 based on the electrical signal provided at the identification pin being indicative that the identification pin 361 is available for communication or not (at step 540 or optional step 560).

Furthermore, as an example, since it has been detected in step 220' that the apparatus connected to the data interface 360 is configured to perform a communication via the at least one data pin, it is allowed that a first communication may be performed between the connected apparatus and the second apparatus 300 via the at least one data pin 362 of the data interface 360, wherein a second communication may be performed between the connected apparatus and the second apparatus via the identification pin when this communication is enabled in step 230'. This first and second communication may be performed simultaneously.

As an example, an USB compliant serial communication may be performed via the at least one data pin 362 and, simultaneously, the communication via the identification pin 361 might be performed.

Figure 4A:
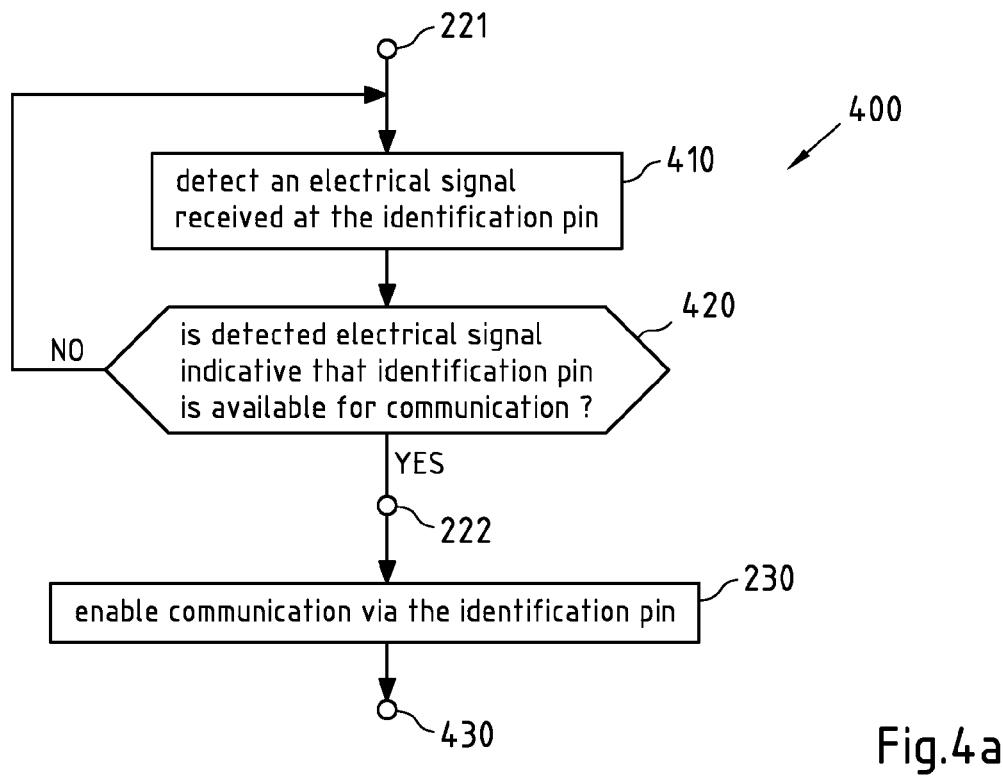
FIG. 4a: a flowchart of a second example embodiment of a method according to a first aspect of the invention.

FIG. 4a depicts a flowchart 400 of a second example embodiment of a method 400 according to the first aspect of the invention. For instance, apparatus 10 or the first apparatus 250 might be configured to perform method 400.

As an example, as indicated by reference signs 221 and 222 in FIG. 4a, steps 410 and 423 of method 400 may be inserted between reference signs 221 and 222 in method 200. Thus, as an example, if the checking whether the second apparatus is configured to perform a further communication via the identification pin in step 220 of method 200 yields a positive result, method 200 may proceed at reference sign 221 depicted in FIG. 4. For instance, it may be assumed at the beginning of method 400 that no communication via the identification pin 261 is enabled (e.g., a communication corresponding to that enabled in step 230 of method 200).

In a step 410 an electrical signal received at the identification pin 261 of the data interface 260 is detected. For instance, under the non-limiting assumption that the second apparatus 300 is connected to the data interface 260 of the first apparatus 250, said electrical signal received at the identification pin 261 might represent the electrical signal being indicative that the identification pin is available for communication via the identification pin provided by the second apparatus 300 in step 540 or might represent the electrical signal being indicative that the identification pin is not available for communication via the identification pin provided by the second apparatus 300 in optional step 560 in method 500 depicted in FIG. 5.

For instance, said detecting an electrical signal received at the identification pin 261 may comprise monitoring at least one electrical quantity of the electrical signal at the identification pin, wherein a monitored electrical quantity may for instance represent a current flowing at least partially through the identification pin 261 (or flowing completely through the identification pin 261) or may represent a voltage at the identification pin 261.

In step 420 it is checked whether the detected electrical signal is indicative that the identification pin 261 is available for communication.

For instance, this checking performed in step 420 may comprise determining whether an electrical state of an electrical quantity of the at least one monitored electrical quantity is detected which corresponds to an electrical state of at least one predefined electrical state. For instance, a first predefined electrical state may be associated with an electrical signal being indicative that the identification pin is available for communication and a second predefined electrical state may be associated with an electrical signal being indicative that the identification pin is not available for communication. Thus, it may be checked in step 420 whether the first predefined electrical state is detected or not.

If the checking performed in step 420 yields a positive result, and under the exemplary assumption that no communication via the identification pin 261 is enabled, in step 230 the controller 270 enables the communication via the identification pin 230. Furthermore, for instance, if the communication via the identification pin 261 was enabled, the enabled communication via the identification pin 261 is maintained in step 230 in FIG. 4a.

Thus, the second apparatus 300 connected to the data interface 260 of the first apparatus 250 can control the communication via the identification pin and may trigger a start of this communication by means of providing the electrical signal being indicative that the identification pin is available for communication at the identification pin, which is received at the identification pin 261 of the first apparatus and can be detected in step 410 in order to enable the communication via the identification pin 261 in step 230, as explained above with respect to method 400 depicted in FIG. 4a.

For instance, said monitored electrical quantity may represent a voltage detected at the identification pin 261, and said checking performed in step 420 may comprise determining whether a predefined voltage offset occurs at the identification pin 261, wherein said predefined voltage offset may represent a negative voltage offset, i.e., the voltage at the identification 261 is lowered in accordance with the predefined voltage offset. As an example, said predefined voltage offset may represent a voltage offset range. If a determined voltage offset monitored at the identification pin 261 corresponds to the said predefined voltage offset, which might include that the determined voltage offset is within said predefined voltage offset range, the checking performed in step 420 may yield a positive result. For instance, said predefined voltage offset range might represent a predefined voltage offset range being adapted to the predefined voltage level offset(s) used in step 540 of method 500 for lowering the voltage at the identification pin, wherein said predefined voltage offset range is chosen such that the predefined voltage level(s) are within said predefined voltage offset range.

Or, as an example, said monitored electrical quantity may represent a voltage detected at the identification pin 261, and said checking performed in step 420 may comprise checking whether the voltage at the identification pin 261 is less than a first predefined voltage level threshold. For instance, with respect to FIG. 6, if the voltage monitored at the identification pin is less than a first predefined voltage between U1 and U1' then the signal being indicative that the identification pin is available for communication can be detected at the identification pin 261 since this low voltage only can occur due to lowering the voltage at the identification at step 540. Furthermore, as an example, this criterion may be combined with checking whether the voltage at the identification pin 261 is higher than a second predefined voltage level threshold, wherein the second predefined voltage level threshold is less than the first predefined voltage level. Accordingly, this combined criterion represents a checking whether the voltage is in a predefined voltage range, wherein, for example, it may be checked whether the monitored voltage is in a predefined voltage range of at least two different voltage ranges, wherein each of the different voltage ranges might be associated with a respective voltage level (e.g. U1 and U2 depicted in FIG. 6) associated with a further signal on the identification pin and wherein for each voltage level a voltage range is defined, wherein a respective lowered voltage level (being lowered by the respective voltage level offset) is within the respective voltage range.

Or, as an example, said monitored electrical quantity may represent a current at least partially flowing through the identification pin 261 of the data interface 260 of the first apparatus 250 and said checking performed in step 420 may comprise determining whether a predefined current offset occurs at the current flowing at least partially through the identification pin, wherein said predefined current offset may represent a negative current offset, i.e., the current monitored is lowered in accordance with the predefined current offset. As an example, said predefined current offset may represent a current offset range. If a determined current offset monitored at the identification pin 261 corresponds to the said predefined current offset, which might include that the determined current offset is within said predefined current offset range, the checking performed in step 420 may yield a positive result.

Or, as an example, said monitored electrical quantity may represent a current at least partially flowing through the identification pin 261 of the data interface 260 of the first apparatus 250 and said checking performed in step 420 may comprise determining whether the current flowing at least partially through the identification pin is less than a first current level threshold. Furthermore, as an example, this criterion may be combined with checking whether the current at the identification pin 261 is higher than a second predefined current level threshold, wherein the second predefined current level threshold is less than the first predefined current level. Accordingly, this combined criterion represents a checking whether the current is in a predefined current range, wherein, for example, it may be checked whether the monitored current is in a predefined current range of at least two different current ranges, wherein each of the different current ranges might be associated with a respective voltage level (e.g. U1 and U2 depicted in FIG. 6) associated with a further signal on the identification pin (e.g. provided by the communication unit 380 of the second apparatus 300) and wherein for each voltage level a current range is defined, wherein a respective lowered voltage level (being lowered by the respective voltage level offset) causes a current within the respective current range.

Figure 4B:
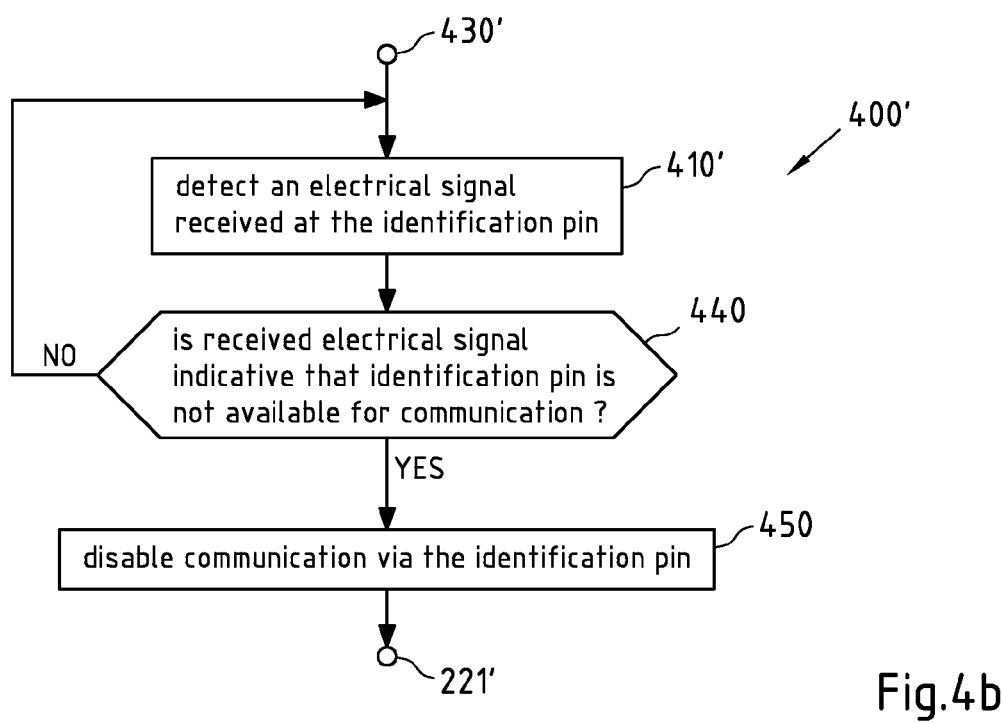
FIG. 4b: a flowchart of a third example embodiment of a method according to a first aspect of the invention.

FIG. 4b depicts a flowchart 500 of a third example embodiment of a method 500 according to the first aspect of the invention. For instance, apparatus 10 or the first apparatus 250 might be configured to perform method 400'.

Furthermore, for instance, it may be assumed at the beginning of method 400' that a communication via the identification pin 261 is enabled at reference sign 430'.

As an example, as indicated by reference sign 430' in FIG. 4b and by reference sign 430', this method 400' might be performed step 230 of method 400 is performed, i.e., method 400' may be connected to method 400 by jumping from reference sign 430 to reference sign 430'.

In a step 410' an electrical signal received at the identification pin 261 of the data interface 260 is detected which might be performed in accordance with step 410 depicted in FIG. 4a. For instance, under the non-limiting assumption that the second apparatus 300 is connected to the data interface 260 of the first apparatus 250, said electrical signal received at the identification pin 261 might represent the electrical signal being indicative that the identification pin is available for communication via the identification pin provided by the second apparatus 300 in step 540 or might represent the electrical signal being indicative that the identification pin is not available for communication via the identification pin provided by the second apparatus 300 in optional step 560 in method 500 depicted in FIG. 5.

For instance, said detecting an electrical signal received at the identification pin 261 may comprise monitoring at least one electrical quantity of the electrical signal at the identification pin, wherein a monitored electrical quantity may for instance represent a current flowing at least partially through the identification pin 261 (or flowing completely through the identification pin 261) or may represent a voltage at the identification pin 261.

In step 440 it is checked whether the detected electrical signal is indicative that the identification pin 261 is not available for communication.

For instance, this checking performed in step 420 may comprise determining whether an electrical state of an electrical quantity of the at least one monitored electrical quantity is detected which corresponds to an electrical state of at least one predefined electrical state. For instance, a first predefined electrical state may be associated with an electrical signal being indicative that the identification pin is available for communication and a second predefined electrical state may be associated with an electrical signal being indicative that the identification pin is not available for communication. Thus, it may be checked in step 440 whether the second predefined electrical state is detected or not.

If the checking performed in step 440 yields a positive result, and under the exemplary assumption that a communication via the identification pin 261 is enabled, in step 450 the controller 270 disables the communication via the identification pin 230. Furthermore, for instance, if the communication via the identification pin 261 was disabled, the disabled communication via the identification pin 261 is maintained in step 450 in FIG. 4b.

Thus, the second apparatus 300 connected to the data interface 260 of the first apparatus 250 can control the communication via the identification pin and may trigger a stop of this communication by means of providing the electrical signal being indicative that the identification pin is not available for communication at the identification pin, which is received at the identification pin 261 of the first apparatus and can be detected in step 410' in order to disable the communication via the identification pin 261 in step 450, as explained above with respect to method 400' depicted in FIG. 4.

Furthermore, for instance, method 400' may jump at reference sign 221' to the beginning of method 400 (indicated by reference sign 221), and afterwards method 400 may jump back from reference sign 430 to the beginning of method 400.

For instance, said monitored electrical quantity may represent a voltage detected at the identification pin 261, and said checking performed in step 440 may comprise determining whether a predefined voltage offset occurs at the identification pin 261, wherein said predefined voltage offset may represent a positive voltage offset, i.e., the voltage at the identification 261 is raised in accordance with the predefined voltage offset. As an example, said predefined voltage offset may represent a voltage offset range. If a determined voltage offset monitored at the identification pin 261 corresponds to the said predefined voltage offset, which might include that the determined voltage offset is within said predefined voltage offset range, the checking performed in step 420 may yield a positive result. For instance, said predefined voltage offset range might represent a predefined voltage offset range being adapted to the predefined voltage level offset(s) used in optional step 560 of method 500 for raising the voltage at the identification ping, wherein said predefined voltage offset range is chosen such that the predefined voltage level(s) are within said predefined voltage offset range.

Or, as an example, said monitored electrical quantity may represent a voltage detected at the identification pin 261, and said checking performed in step 440 may comprise checking whether the voltage at the identification pin 261 is higher than a first predefined voltage level threshold. For instance, with respect to FIG. 6, if the voltage monitored at the identification pin is higher than a first predefined voltage between U2' and U2' then the signal being indicative that the identification pin is not available for communication can be detected at the identification pin 261 since this high voltage only can occur due to raising the voltage at the identification at step 540. Furthermore, as an example, this criterion may be combined with checking whether the voltage at the identification pin 261 is less than a second predefined voltage level threshold, wherein the second predefined voltage level threshold is higher than the first predefined voltage level. Accordingly, this combined criterion represents a checking whether the voltage is in a predefined voltage range, wherein, for example, it may be checked whether the monitored voltage is in a predefined voltage range of at least two different voltage ranges, wherein each of the different voltage ranges might be associated with a respective voltage level (e.g. U1 and U2 depicted in FIG. 6) associated with a further signal on the identification pin and wherein for each voltage level a voltage range is defined, wherein a respective raised voltage level is within the respective voltage range. For instance, the respective raised voltage level corresponds to the respective voltage level of the further signal and thus, the respective voltage range may be chosen such that the respective voltage level associated with one of the at least two voltage levels is within a respective voltage range associated with the respective voltage level.

Or, as an example, said monitored electrical quantity may represent a current at least partially flowing through the identification pin 261 of the data interface 260 of the first apparatus 250 and said checking performed in step 440 may comprise determining whether a predefined current offset occurs at the current flowing at least partially through the identification pin, wherein said predefined current offset may represent a positive current offset, i.e., the current monitored is raised in accordance with the predefined current offset. As an example, said predefined current offset may represent a current offset range. If a determined current offset monitored at the identification pin 261 corresponds to the said predefined current offset, which might include that the determined current offset is within said predefined current offset range, the checking performed in step 420 may yield a positive result.

Or, as an example, said monitored electrical quantity may represent a current at least partially flowing through the identification pin 261 of the data interface 260 of the first apparatus 250 and said checking performed in step 440 may comprise determining whether the current flowing at least partially through the identification pin is higher than a first current level threshold. Furthermore, as an example, this criterion may be combined with checking whether the current at the identification pin 261 is less than a second predefined current level threshold, wherein the second predefined current level threshold is higher than the first predefined current level. Accordingly, this combined criterion represents a checking whether the current is in a predefined current range, wherein, for example, it may be checked whether the monitored current is in a predefined current range of at least two different current ranges, wherein each of the different current ranges might be associated with a respective voltage level (e.g. U1 and U2 depicted in FIG. 6) associated with a further signal on the identification pin (e.g. provided by the communication unit 380 of the second apparatus 300) and wherein for each voltage level a current range is defined, wherein a respective voltage level (being raised by the respective voltage level offset, wherein this may represent the voltage level of the at least two voltage levels) causes a current within the respective current range.

Figure 7:
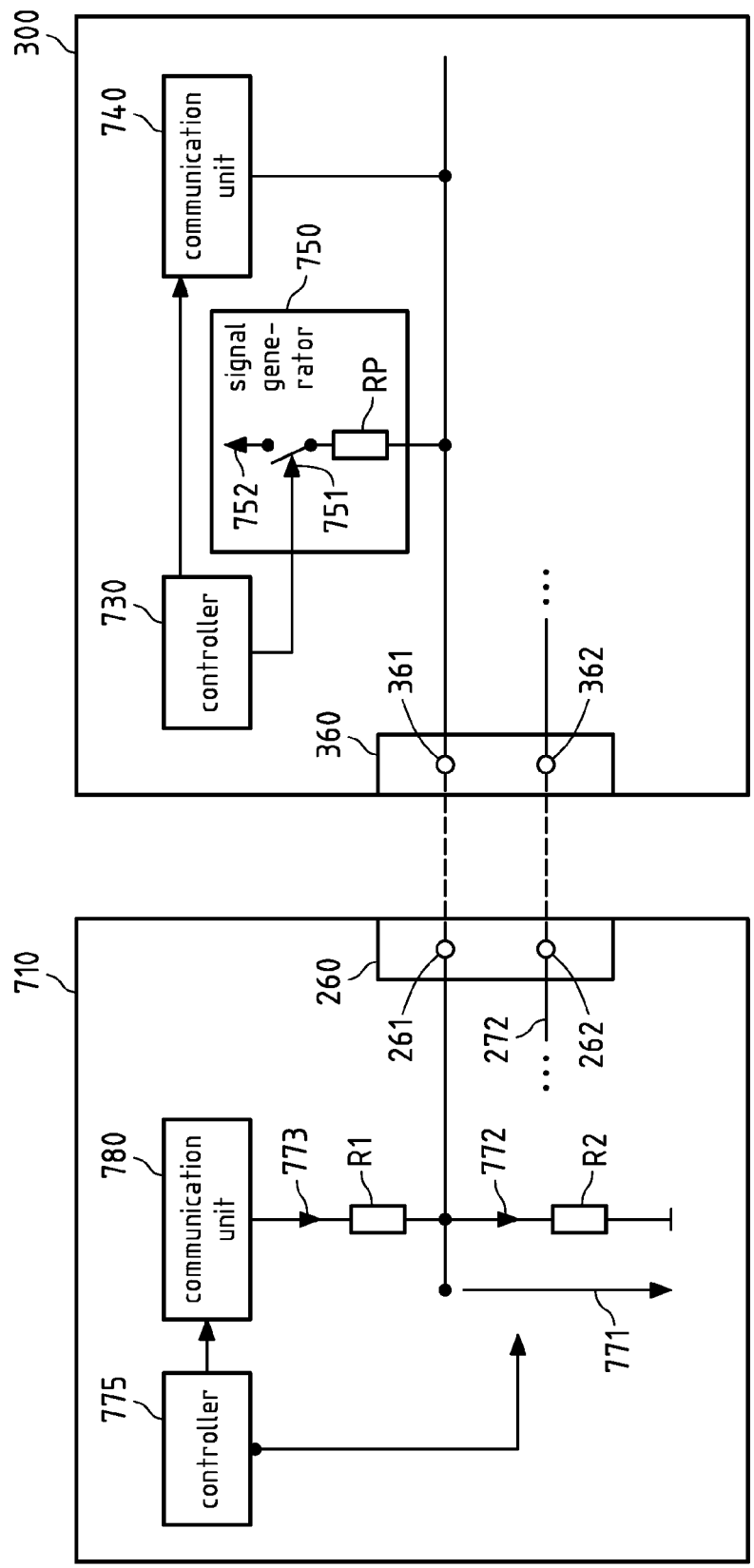
FIG. 7: an example embodiment of a system according to an aspect of the invention.

FIG. 7 depicts an example embodiment of a system 700 according to the first and second aspect of the invention.

System 700 comprises a first apparatus 710 which may correspond or may be based on the first apparatus 250 according to a first aspect of the invention and might be configured to perform one or any of the methods 200, 400 and 400'. For instance, controller 770 may correspond or may be based on controller 270 and communication unit 780 may correspond or may be based on communication unit 280. Furthermore, the first apparatus 710 comprises at least one resistor R1, R2, wherein a resistor R2 may be connected between the identification pin 261 and ground. As an example, the monitored electrical quantity monitored by controller 770 might represent a voltage 771 between the identification pin 261 and ground, or it might represent a current 773 flowing through resistor R1 or a current 772 flowing through resistor R2.

Furthermore, system 700 comprises a second apparatus 720 which may correspond or may be based on the second apparatus 300 according to the second aspect of the invention and might be configured to perform method 500. For instance, controller 730 may correspond or may be based on controller 370 and communication unit 740 may correspond or may be based on communication unit 380.

Furthermore, the second apparatus comprises a signal generator 750 which may comprise a voltage pull-up element RP (which may represent a resistor RP) placed between a voltage source 752 (e.g., providing supply power) and the identification pin 361, wherein the controller 730 might be configured to open a switch 751 in order to lower the voltage at the identification pin 361 by disconnecting the voltage pull-up element RP which might be performed in order to provide the signal being indicative that the identification pin 361 is available for communication via the identification pin 361 at step 540 of method 500 depicted in FIG. 5. Or, as another example, the controller 730 might be configured to close switch 751 in order to raise the voltage at the identification pin 361 which might be performed in order to provide the signal being indicative that the identification pin 361 is not available for communication via the identification pin 361 at optional step 560 of method 500 depicted in FIG. 5.

Figure 8:
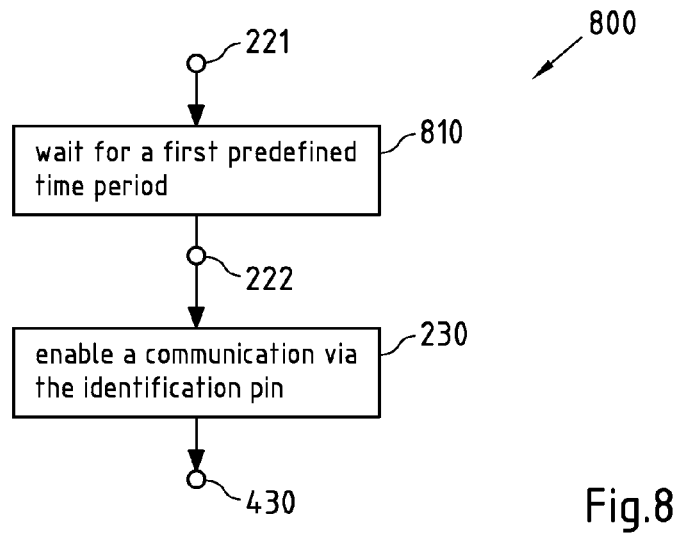
FIG. 8: a flowchart of a fourth example embodiment of a method according to a first aspect of the invention.

FIG. 8 depicts a flowchart 800 of a fourth example embodiment of a method 800 according to the first aspect of the invention. For instance, apparatus 10 or the first apparatus 250 or the first apparatus 710 might be configured to perform method 800.

As an example, as indicated by reference signs 221 and 222 in FIG. 8, steps 810 of method 480 may be inserted between reference signs 221 and 222 in method 200. Thus, as an example, if the checking whether the determined type of the second apparatus configured to perform a communication via the at least one data pin in step 220 of method 200 yields a positive result, method 200 may proceed at reference sign 221 depicted in FIG. 8 and method 800 may be performed. For instance, it may be assumed at the beginning of method 400 that no communication via the identification pin 261 is enabled (e.g., a communication corresponding to that enabled in step 230 of method 200).

In a step 810 it is waited for a first predefined time period, and afterwards (e.g., immediately after lapse of the first predefined time period or at a later stage) a communication via the identification pin is enabled in step 230 as mentioned before. For instance, this first predefined time period may be adapted in accordance with a data interface standard associated with the data interface 260 of the first apparatus, wherein this first predefined time period is chosen in such a way that it is waited until an initial communication via the identification pin 261 in accordance with the data interface standard, which may represent a USB standard, has been finished. Thus, it is waited until the identification pin can be used for the further communication enabled in step 230.

For instance, the start time defining the beginning of said first predefined time period may represent a start time of said determining a type of a second apparatus being connected to the data interface 260 of the first apparatus in step 210 of method 200, wherein, as an example, this start time is triggered when it is detected an the electrical quantity exceeds a predefined threshold. For instance, this predefined threshold may indicate that the second apparatus is connected to the data interface 260 of the first apparatus. As an example, said electrical quantity may represent a voltage and said predefined threshold may represent a predefined voltage level.

As an example, this communication may be enabled for a second predefined time interval. For instance, this second predefined time period may be adapted in accordance with a data interface standard associated with the data interface 260 of the first apparatus.

Furthermore, as another example, when performing said communication enabled in step 230 of method 800 the method may jump to method 400' depicted in FIG. 4b and it may be checked whether an electrical signal is received at the identification pin being indicative that the identification pin 261 is not available for communication at step 440. Thus, the communication can be disabled in step 450 based on the detected of such an electrical signal. Accordingly, as an example, it may be monitored whether the second apparatus wants to disabled the communication via the identification pin.

Figure 9:
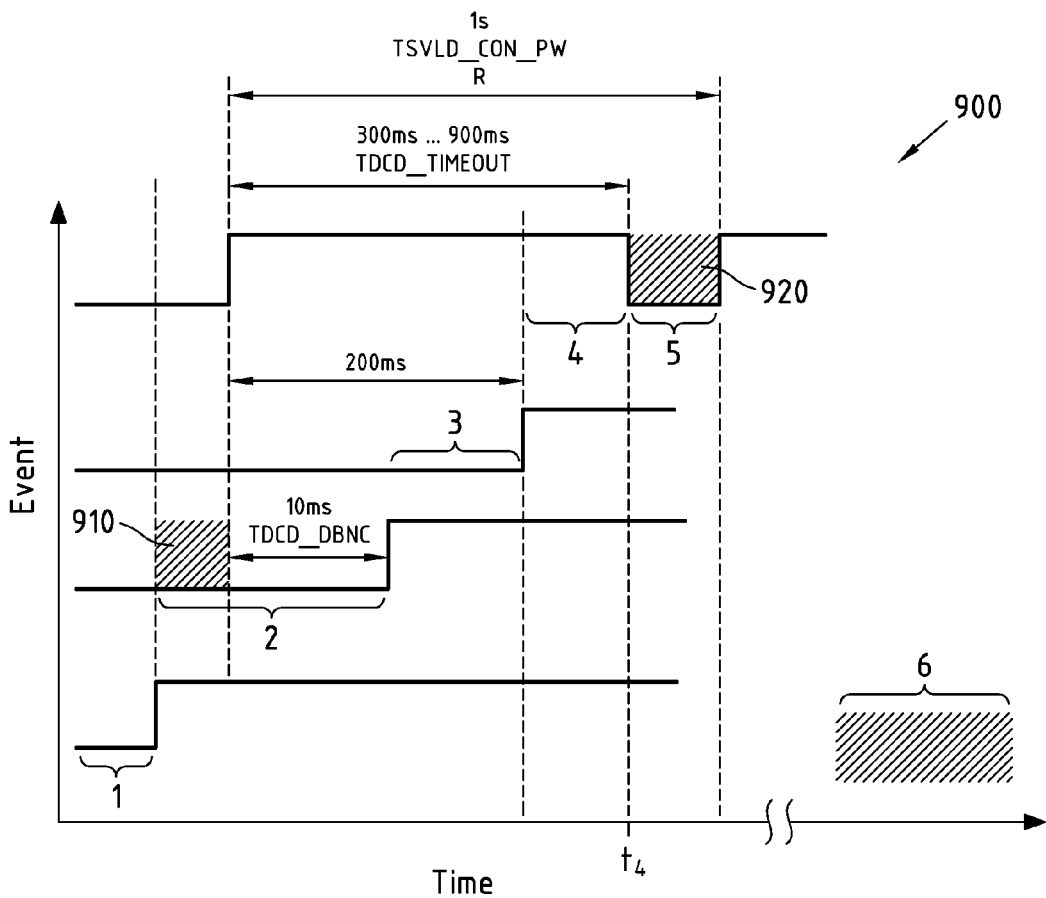
FIG. 9: an example of a timing diagram according to a first aspect of the invention.

FIG. 9 depicts an example of a timing diagram which may be used for method 800 with respect to USB data interfaces.

At reference sign 1 a cable is attached to the data interface 260 of the first apparatus, wherein data interface 260 represents a USB compatible data interface. Reference sign 2 indicates the time needed to keep the identification pin 261 stable to be identified as cable connect, i.e., to identify the second apparatus connected to the data interface and to determine a type of a second apparatus in step 210 of method 200 and to check whether the determined type of the second apparatus is configured to perform a communication via the at least one data pin in step 220. For instance, at the beginning of time interval TDCD_DBNC the voltage at the identification pin 261 may exceed a predefined voltage level which may be detected by the controller of the first apparatus and may trigger the first time period used in step 810 of method 800. As an example, this first time period may be in the range between 300 ms and 900 ms, as exemplarily indicated by time interval TDCD_TIMEOUT in FIG. 9, wherein the first time period may be 300 ms, 900 ms, or any other well-suited time period between 300 ms and 900 ms, or any other well-suited time period shorter than 300 ms or longer than 900 ms.

As an example, indicated by reference sign 3, after the identification pin 261 is stable the VBUS powering may start, and at reference sign 4 it may be time for the device to finalise the data contact detection.

Then, after the first time period has lapsed the communication via the identification pin 261 may be enabled at step 230 in method 800, which may be performed in the time interval indicated by reference sign 920 in FIG. 9. This communication may for instance be stopped after a second predefined time interval (or, as an example, by receiving a signal being indicative that the identification pin is not available for communication).

Thus, a time-domain communication via the identification pin 261 may be performed which may be enabled if there is a time slot available which ensures that there is no interference with other signals on the identification pin.

As used in this application, the term 'circuitry' refers to all of the following:

(a) hardware-only circuit implementations (such as implementations in only analog and/or digital circuitry) and (b) combinations of circuits and software (and/or firmware), such as (as applicable):

(i) to a combination of processor(s) or (ii) to portions of processor(s)/software (including digital signal processor(s)), software, and memory(ies) that work together to cause an apparatus, such as a mobile phone or a positioning device, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

With respect to the aspects of the invention and their embodiments described in this application, it is understood that a disclosure of any action or step shall be understood as a disclosure of a corresponding (functional) configuration of a corresponding apparatus (for instance a configuration of the computer program code and/or the processor and/or some other means of the corresponding apparatus), of a corresponding computer program code defined to cause such an action or step when executed and/or of a corresponding (functional) configuration of a system (or parts thereof).

The aspects of the invention and their embodiments presented in this application and also their single features shall also be understood to be disclosed in all possible combinations with each other. It should also be understood that the sequence of method steps in the flowcharts presented above is not mandatory, also alternative sequences may be possible.

The invention has been described above by non-limiting examples. In particular, it should be noted that there are alternative ways and variations which are obvious to a skilled person in the art and can be implemented without deviating from the scope and spirit of the appended claims.

In particular, it should be noted that the at least one capacitance sensing element may be arranged in other arrangements than presented in the example embodiments. For instance, columns and rows of a capacitance sensing structure may be arranged at least partially irregularly.

The invention claimed is:

1. A method, comprising:
   determining, by a first apparatus, a type of a second apparatus connected to a data interface of the first apparatus, the determination based on at least an electrical signal at an identification pin of the data interface, the data interface further comprising at least one data pin, and the type of the second apparatus relating to a communication via the at least one data pin;
   determining, based at least on the electrical signal, whether the second apparatus is configured to perform the communication via the identification pin;
   in response to determining that the second apparatus is configured to perform the communication via the identification pin, conducting, by the first apparatus, the communication based at least on the electrical signal at the identification pin, the electrical signal at the identification pin comprising a first signal combined with a second signal, the first signal comprising a predefined voltage offset indicative of the second apparatus being configured to perform the communication via the identification pin, and the second signal comprising the communication; and
   adapting, based at least whether the second apparatus is configured to perform the communication via the identification pin, the communication conducted via the at least one data pin.

2. The method according to claim 1, wherein the type of the second apparatus is further determined based on an electrical quantity of the electrical signal at the identification pin.

3. The method according to claim 1, wherein the electrical quantity comprises an electrical current flowing at least partially through the identification pin and/or a voltage at the identification pin.

4. The method according to claim 1, wherein the data interface represents a Universal Serial Bus (USB) interface.

5. The method according to claim 2, wherein the communication is conducted by at least monitoring the electrical quantity of the electrical signal at the identification pin.

6. The method according to claim 1, further comprising: waiting for a time interval between determining the type of the second apparatus and conducting the communication via the identification pin.

7. The method according to claim 1, wherein the second signal comprising the communication alternates between at least two voltage levels and/or alternates between at least two current levels.

8. A computer program product comprising a least one computer readable non-transitory memory medium having program code stored thereon, the program code which when executed by a first apparatus causes the first apparatus to at least:
   determine a type of a second apparatus connected to a data interface of the first apparatus, the determination based on at least an electrical signal at an identification pin of the data interface, the data interface further comprising at least one data pin, and the type of the second apparatus relating to a communication via the at least one data pin;
   determine, based at least on the electrical signal, whether the second apparatus is configured to perform the communication via the identification pin
   in response to determining that the second apparatus is configured to perform the communication via the identification pin, conduct the communication based at least on the electrical signal at the identification pin, the electrical signal at the identification pin comprising a first signal combined with a second signal, the first signal comprising a predefined voltage offset indicative of the second apparatus being configured to perform the communication via the identification pin, and the second signal comprising the communication; and
   adapt, based at least on whether the second apparatus is configured to perform the communication via the identification pin, the communication conducted via the at least one data pin.

9. An apparatus, comprising:
   a data interface comprising an identification pin and at least one data pin,
   a controller configured to at least:
      determine a type of another apparatus connected to the data interface, the determination based on at least an electrical signal at the identification pin of the data interface, the type of the other apparatus relating to a communication via the at least one data pin;
      determine, based at least on the electrical signal, whether the other apparatus is configured to perform the communication via the identification pin;
      in response to determining that the other apparatus is configured to perform the communication via the identification pin, conduct the communication based at least on the electrical signal at the identification pin, the electrical signal at the identification pin comprising a first signal combined with a second signal, the first signal comprising a predefined voltage offset indicative of the second apparatus being configured to perform the communication via the identification pin, and the second signal comprising the communication; and
      adapt, based at least on whether the second apparatus is configured to perform the communication via the identification pin, the communication conducted via the at least one data pin.

10. The apparatus according to claim 9, wherein the type of the other apparatus is further determined based on an electrical quantity of the electrical signal at the identification pin.

11. The apparatus according to claim 10, wherein the electrical quantity comprises an electrical current flowing at least partially through the identification pin and/or a voltage at the identification pin.

12. The apparatus according to claim 9, wherein the data interface represents a Universal Serial Bus (USB) interface.

13. The apparatus according to claim 10, wherein the communication is conducted by at least monitoring the electrical quantity of the electrical signal at the identification pin.

14. The apparatus according to claim 9, wherein the controller is configured to at least: wait for a first time interval between determining the type of the other apparatus and conducting the communication via the identification pin.

15. The apparatus according to claim 14, wherein the communication is conducted via the identification pin for a second time interval.

16. The apparatus according to claim 14, wherein the type of the other apparatus is determined based on at least an electrical quantity of the electrical signal at the identification pin, and wherein the wait for the first time interval is triggered in response to the controller detecting that the electrical quantity exceeds a threshold.

17. The apparatus according to claim 8, wherein the second signal comprising the communication alternates between at least two voltage levels and/or alternates between at least two current levels.

18. The method according to claim 1, wherein the adapting the communication conducted via the at least one data pin comprises:
- in response to the second apparatus not being configured to perform the communication via the identification pin, conducting the communication via the at least one data pin, the communication being conducted via the at least one data pin instead of the communication being conducted via the identification pin; and
- in response to the second apparatus being configured to perform the communication via the identification pin, conducting the communication via the identification pin instead of and/or in addition to conducting the communication via the at least one data pin.

19. The method according to claim 1, wherein the first signal and the second signal are further combined with a third signal indicating the type of the second apparatus.

20. The method of according to claim 1, wherein the first signal further comprises a different voltage offset indicating that the second apparatus is not configured to perform the communication via the identification pin.

* * * * *